United States Patent
Chang et al.

[11] Patent Number: 5,248,535
[45] Date of Patent: Sep. 28, 1993

[54] RELEASE SHEET

[75] Inventors: Keunsuk P. Chang, Fairport; Pang-Chia Lu, Pittsford, both of N.Y.

[73] Assignee: Mobil Oil Corporation, Fairfax, Va.

[21] Appl. No.: 827,314

[22] Filed: Jan. 29, 1992

[51] Int. Cl.$^5$ .............................................. A61F 13/02
[52] U.S. Cl. ..................................... 428/40; 428/352; 428/451; 428/516; 428/520; 428/447
[58] Field of Search ................ 428/40, 352, 451, 516, 428/520, 447; 156/243

[56] References Cited

U.S. PATENT DOCUMENTS

| | | | |
|---|---|---|---|
| 4,859,511 | 8/1989 | Patterson | 428/212 |
| 4,946,532 | 8/1990 | Freeman | 428/40 |
| 5,084,317 | 1/1992 | Epple | 428/40 |

Primary Examiner—George F. Lesmes
Assistant Examiner—Nasser Ahmad
Attorney, Agent, or Firm—Alexander J. McKillop; Charles J. Speciale; George W. Hager, Jr.

[57] ABSTRACT

A composite sheet of a film form base liner, a cured release coating laminated to at least one side of the base liner, and a skin, on the top-most portion of the base liner proximate to the release coating, comprising a polymer which is compatible with the base liner and contains pendant acid groups.

12 Claims, No Drawings

RELEASE SHEET

This invention relates to composite film form materials suitable for use as release sheets. It more specifically refers to such composite materials having improved ink adhesion characteristics.

BACKGROUND OF THE INVENTION AND PRIOR ART

Composite polymeric film form materials are well known in the plastics art. It is well known to make such a composite of a construction such that it is usable for applying releasably secured film form material thereto, such as peelable labels.

In the known construction, a base liner of suitable film form material has a release coating applied to at least one surface thereof. A tacky adhesive material is applied to at least one surface of a face stock, and the face stock is releasably adhered to the base liner by contact of this tacky adhesive with the release coating.

The release coating is a material which adheres well to the base liner but has the property of only lightly holding, and therefore easily releasing, the adhesive coated face stock film form material which is applied thereover. This structure allows the production of peelable labels and the like in a most efficient fashion.

In this sort of composite film form material, it is conventional to make the release coating out of an electron beam curable composition comprising a silicone resin to which crosslinkable groups, such as acrylic residues, have been appended. The silicone portion of the composition acts as a release agent, and the acrylic groups act to crosslink the release coating composition together and to bond this composition to the base liner surface.

It has been found that, although this composite structure works well and constitutes a commercially available material, there are some things about this structure which perform less than satisfactorily. It has been found that, when the composite of the release coating and the base liner is made as an extended length film, and it is rolled up upon itself for storage, subject to later use by having face stock suitably applied thereto, portions of the release coating composition apparently do not crosslink when subjected to the electron beam curing process. It is not known if these portions of the compositions do not have acrylic substituents, or if they do have such substituents and just have not reacted sufficiently to be well bound into the release sheet.

In any case, whatever is the reason, these more mobile portions of the release coating composition, principally those portions which are on the exposed surface of the release coating, called in the industry "loose juice", tend not to remain in the release coating composition layer. Upon the composite base liner and release coating being rolled up for storage or shipping, these portions come loose and transfer to the other side of the base liner; that is the back side of the base liner which is in contact with the release coating when the composite is rolled up. Upon transfer of this material to the back side of the base liner, it interferes with the later printing of indicia on the back side of the composite film.

Further, when the composite film material is unrolled, and a face stock is adhered over the release coating, it is conventional practice to once again roll up this new composite, of base liner, release coating, and face stock, for storage and transportation. Just as some of the loose juice tended to transfer from the release coating to the back of the base liner when the original composite was rolled up, some of the loose juice which is on the back of the base liner then tends to retransfer to the top of the face stock when this composite is rolled up. In this location, the transferred loose juice interferes with the adhesion of inked indicia sought to be printed on the top of the face stock.

Still further, the presence of unbonded silicone moieties which exist in the release coating tends to be detrimental to this product even if they do not transfer to the back of the base liner. Even if some of this loose juice transfers to the back of the base liner, still more of it stays in the release coating. At least some of the loose juice which remains in the release coating tends to migrate to the tacky adhesive on the face stock and reduces or eliminates its tackiness. The peelable face stock is necessarily tacky in this product or it will not adhere to another surface after it has been peeled from the base liner. If the tackiness of the adhesive is reduced or eliminated, the face stock cannot be used for its intended purpose.

OBJECTS AND BROAD STATEMENT OF THIS INVENTION

It is therefore an important object of this invention to provide means to prevent or at least retard the transference of mobile components of the release coating, containing silicone molecules, out of the release coating and onto other surfaces.

It is another object of this invention to provide means for constructing a composite film form material made up of a base liner and a release coating having improved ink retention properties.

It is a further object of this invention to provide a composite film form material made up of a base liner, a release coating, and a face stock releasably adhesively adhered to the release coating having improved ink retention properties on both the exposed surface of the base liner and of the face stock.

Other and additional objects of this invention will become apparent from a consideration of this entire specification as well as the claims appended hereto.

In accord with and fulfilling these objects, one aspect of this invention comprises a composite film form material comprising a film form base liner, and a release coating adhered to at least one surface thereof, where the top-most portion of the base liner, that is the surface of the base liner proximate to the release coating, comprises a polymer containing pendant acid groups which is compatible with the base liner material. For example, where the base liner is polypropylene, this surface portion can suitably be a copolymer of propylene and an olefinically unsaturated acid. The release coating and the base liner are suitably conventional materials which are known to be used for this purpose. Indeed, even the acid containing copolymer may be a conventionally known material. The invention here is in the use to which this material is being put.

Another aspect of this invention comprises a composite film form material comprising a film form base liner, a release coating adhered to at least one surface thereof, and a face stock releasably adhesively adhered to at least one of the release coatings, where the top-most portion of the base liner, that is the surface of the base liner, proximate to the release coating, comprises a polymer, containing pendant acid groups, which is compatible with the base liner material. For example, where the base liner is polypropylene, this surface portion can suitably be a copolymer of propylene and an olefinically unsaturated acid.

As in the embodiment of this invention described above, the base liner, the release coating, the face stock, and the adhesive releasably securing the face stock to the release coating are all conventional materials which are known to be used for this purpose. Indeed, even the acid containing copolymer may be a conventionally known material. The invention here is in the use to which this material is being put.

According to this invention, a compatible polymer containing at least one pendant acid is disposed as or on at least one surface of the base liner. In the embodiment where there is a release coating disposed on only one surface of the base liner, the acid containing polymer may be disposed on the other surface of the base liner, and/or it may be disposed on the surface of the base liner adjacent the release coating, that is between the release coating and the base liner.

Where there are release coatings disposed on both surfaces of the base liner, it is suitable to provide the acid containing polymer skin between one or both of these release coatings and the adjacent base liner. In this embodiment, it is preferred to provide the acid containing polymer between both release coatings and their respective proximate base liner surfaces.

DETAILED DESCRIPTION OF THIS INVENTION

The acid containing polymer is defined as a polymer which contains pendant acid groups and which is compatible or partially compatible with the base liner material. It may be a homopolymer or copolymer of at least one olefinically unsaturated carboxylic acid, such as acrylic acid, or it may be a copolymer of at least one olefin and at least one other monomer copolymerizable therewith which has at least one pendant carboxy group. The unsaturated acid is exemplified by: acrylic acid, methacrylic acid, itaconic acid, maleic acid, crotonic acid, fumaric acid, and other similar, olefinically unsaturated acids. It is considered that the residues of these acids are the moieties which are contained in the polymer. Therefore, the exact moiety which is used to introduce these acids into the polymer is not critical to the practice of this invention. Thus, esters, anhydrides, acid chlorides, and the like, as well as the acids themselves, are suitable for use in this invention. Where the acid containing moiety is not the acid itself, it may be necessary or desirable to treat the copolymer so produced to spring the acid.

The olefin to be copolymerized with the unsaturated acid is exemplified by at least one lower olefins such as: ethylene, propylene, butene-1, hexene-1, octene-1, and decene-1. The specific comonomer olefin is not critical so long as the ultimate acid pendant copolymer is compatible with the base liner material to an extent sufficient for the skin to adhere to the base liner. Other monomers may be incorporated into this skin composition if desired.

Where copolymers consisting of more than one acid containing monomer are used in this invention, the proportions of each monomer may vary widely. Since all of the monomers in this embodiment contain pendant acid moieties, the exact proportion of each can be selected in order to achieve other physical properties of this skin material as desired.

Where copolymers of at least one acid contributing monomer and at least one non-acid contributing monomer are used in this aspect of this invention, these different components may be use in proportions of about 2 to 50 weight percent acid contributing monomer(s) and 98 to 50 weight percent non-acid contributing monomer(s). It has been found to be preferable to employ a polymer skin having at least about 3, up to a maximum of about 70 acid groups per 10,000 weight average molecular weight.

There is no particular limit on the thickness of the acid containing polymer skin. Suitably, the skin should be about 1 to 10 $\mu$m thick, that is constitute about 2 to 20% of the thickness of the base liner.

The base liner is a film form material which is preferably polymeric. These materials are conventional in this art and are exemplified by: paper, oriented polypropylene, polyethylene terephthalate, polyethylene, polyamides, polystyrene and the like.

The release coating is a composition which, when applied to the base liner, has very low surface tack and therefore has the ability to readily release materials, particularly polymeric films, disposed thereon. In general, those silicone polymers which will release materials overlayed thereon, and which can be cured or crosslinked by conventional means, such as electron beam, ultraviolet radiation, heat, and the like, are appropriately used. An example of a material which is suited to use as a release coating is a silicone-acrylate composition. One such preferred release coating composition is an electron beam cured silicone-acrylate copolymer described in the E P0281681-A1 patent by Goldschmidt, AG.

It is common to use a composition for the release coating which is disposed on the base liner in an uncured form and is then cured in place. One of the techniques used to apply this release coating is to coat an uncured composition on a surface of the base liner and then to impinge an electron beam onto this composition for a time and under conditions suitable for converting this coating into a crosslinked film which is adhered to the surface of the base liner. The thus crosslinked release coating contains mostly crosslinked silicone acrylate moieties which are bound together and to the surface of the base liner.

The face stock is conventional film form material which is well known to be used for this service. Exemplary of materials which are suited to use in this service are films of paper, polyethylene terephthalate, polyethylene, polystyrene, metal foils, etc.

The adhesive is a conventional material which is well known to be used for this service. Exemplary of adhesive materials which are known to be used here are acrylic emulsions, such as those sold commercially under the name XPLA-12, by the Dyna-tech Company, styrene-butadiene rubber emulsions, such as those sold under the name Bond-master 72-9718 by National Starch Company, and hot-melt adhesives, such as those sold under the trade name HL-2021, or HL-2203X, by the H. B. Fuller Company.

In a copending application Ser. No. 611,578 filed in November, 1990, by at least some of the inventors of this invention, the base liner is provided at the surface thereof which is adjacent the release coating, with a skin of a material having tougher physical properties. When the face stock is releasably secured to the release coating, and then die cut into suitable shapes, the cutting die is retarded from penetrating and cutting through the base liner by the presence of this tougher skin layer. Such a structure of the base liner is intended to be included within the instant specification, and the entire contents of that application is incorporated herein by reference.

It is intended to be within the scope of this invention, to dispose the acid containing polymer skin material of this invention on top of the tough skin material as disclosed in this copending application. In this structure, the benefits of both toughness and retention of the "loose juice" silicone material is accomplished. It is also an embodiment of this invention to provide an acid containing skin layer on the base liner which is made of a polymer which is tougher than the base liner polymer itself. Such a polymer will then serve both functions, of protecting the base liner from being cut by the die, and controlling the "loose juice", simultaneously.

SPECIFIC EXAMPLES OF THE PRACTICE OF THIS INVENTION, AND BEST MODE CONTEMPLATED FOR PRACTICING THIS INVENTION

In the following examples, parts and percentages are by weight unless expressly stated to be on some other basis. These examples are illustrative of the practice of this invention, and are not to be construed as limiting on the scope thereof.

EXAMPLE

A series of base liner sheets of oriented polypropylene, nominally 2 mils thick, were coated on one surface thereof with a copolymer of propylene and maleic anhydride. The coating weighed 1.6 gm/1000 square inches. The thus coated base liner surface was then coated with a conventional silicone-acrylate release composition on the coated side. The release coating side of the composite so formed was electron beam cured at a radiation dose of 2 Mrads under a nitrogen atmosphere, at a line speed of 50 feet per minute to form a release layer weighing 0.6 gms/1000 square inches.

After curing, the composite film was rolled up in a conventional manner and stored in the rolled condition for at 125° F. for four (4) days. The back side of the composite film was imprinted with a #8800 Berol Magic Marker which was then tested for ink retention. This sample showed substantially no ink wetting problems, that is, on a scale of 1-10, with 10 being the best ink retention and 1 being the worst, this sample was judged to be an 8.

This indicated that the provision of the acid containing skin on the base liner drastically reduced the effect of detrimental ink wetting by the loose silicone material from transferring out of the release coating onto the back of the composite film when it was rolled up in storage.

COMPARATIVE EXAMPLE

The same base liner was coated with the same release coating as in the example, only the surface layer of the acid modified polypropylene on the base liner was omitted. The same curing was performed and the same testing of the back side was carried out. This composite material scored a 1 on the same test as outlined above. This meant that there was severe ink wetting and retention problems.

It is clear from a consideration of these data that the provision of an acid containing skin layer on the surface of the base liner according to this invention, substantially reduced the poor ink wetting resulting from unwanted transference of mobile fragments from the release coating to the base liner during storage.

What is claimed is:

1. In a composite, self supporting, flexible sheet comprising a film form liner having laminated to one side thereof a cured silicone-acrylate release coating wherein said release coating contains mobile portions; the improvement which comprises at least the side of said base liner proximate to said release coating having a skin thereon comprising a polymer containing pendant carboxylic acid groups in an amount sufficient to at least reduce the amount of said mobile portions from exiting said release coating and transfer to the other side of said base liner upon rolling up said sheet.

2. The composite sheet claimed in claim 1 wherein said acidic polymer skin is disposed only between said base liner and said release coating.

3. The composite sheet claimed in claim 2 wherein said acidic polymer skin is also disposed on the side of said base liner opposite to the side on which said release coating is laminated.

4. The composite sheet claimed in claim 2 including ink indicia disposed on the side of said base liner opposite to said release .

5. The composite sheet claimed in claim 1 including tacky adhesive adhered to said release coating.

6. The composite sheet claimed in claim 5 including a face stock film releasably secured to said adhesive.

7. The composite sheet claimed in claim 1 wherein said acid containing polymer is a homopolymer.

8. The composite sheet claimed in claim 1 wherein said acid containing polymer is a copolymer of at least one olefinic compound containing at least one acid moiety and at least one different olefin.

9. The composite sheet claimed in claim 1 including a film form face stock having tacky adhesive disposed on at least one side thereof, said face stock being releasably adhered to said release coating through said tacky adhesive.

10. The composite sheet claimed in claim 1 wherein said base liner is at least one member selected from the group consisting of paper, oriented polypropylene, polyethylene terephthalate, polyethylene, polyamide, and polystyrene.

11. The composite sheet claimed in claim 1 wherein said polymer containing pendant acid groups is a homo or copolymer derived from at least one monomer selected from the group consisting of acrylic acid, methacrylic acid, itaconic acid, maleic acid, fumaric acid, esters of said acids, anhydrides of said acids, and halides of said acids.

12. The composite sheet claimed in claim 1 wherein said polymer containing pendant acid groups is a copolymer of at least one acid contributing moiety selected from the group consisting of acylic acid, methacrylic acid, itaconic acid, fumaric acid, esters of said acids, and halides of said acids; and at least one olefinic moiety selected from the group consisting of ethylene, propylene, butene-1, hexene-1, octene-1 and decene-1.

* * * * *